United States Patent [19]
Yoshida et al.

[11] Patent Number: 5,383,106
[45] Date of Patent: Jan. 17, 1995

[54] REGENERATIVE CONTROL TYPE SWITCHING POWER SOURCE DEVICE

[75] Inventors: Koji Yoshida, Neyagawa; Nobuyoshi Nagagata, Takatsuki; Takuya Ishii, Suita, all of Japan

[73] Assignee: Matsushita Electric Industrial Co., Ltd., Osaka, Japan

[21] Appl. No.: 1,646

[22] Filed: Jan. 7, 1993

[30] Foreign Application Priority Data

Jan. 10, 1992 [JP] Japan .................................. 4-002683

[51] Int. Cl.6 ............................................. H02M 3/28
[52] U.S. Cl. ....................................... 363/15; 363/18; 363/55; 363/131
[58] Field of Search .................. 363/15, 16, 18, 19, 363/20, 21, 55, 56, 131

[56] References Cited

U.S. PATENT DOCUMENTS

| | | | |
|---|---|---|---|
| 3,596,165 | 7/1971 | Andrews | 363/19 |
| 4,464,709 | 8/1984 | Barter | 363/16 |
| 4,814,962 | 3/1989 | Magalhaes et al. | 363/16 |
| 4,959,764 | 9/1990 | Bassett | 363/16 |
| 4,975,821 | 12/1990 | Lethellier | 363/21 |
| 5,126,931 | 6/1992 | Jitaru | 363/21 |
| 5,146,394 | 9/1992 | Ishii et al. | 363/16 |
| 5,159,541 | 10/1992 | Jain | 363/131 |
| 5,173,846 | 12/1992 | Smith | 363/20 |

FOREIGN PATENT DOCUMENTS

| | | |
|---|---|---|
| 0336725 | 11/1989 | European Pat. Off. . |
| 0404191 | 12/1990 | European Pat. Off. . |
| 0464246 | 8/1992 | European Pat. Off. . |
| 382366 | 4/1991 | Japan . |

*Primary Examiner*—Jeffrey L. Sterrett
*Attorney, Agent, or Firm*—Spencer, Frank & Schneider

[57] ABSTRACT

Disclosed is a switching power source device for supplying a DC stabilized voltage to industrial or household electronic appliances. The power source device can restrict a change in the switching frequency due to the change in load so that low noise and high efficiency can be realized. The power source device includes a first rectifying and smoothing circuit and a second rectifying and smoothing circuit. The first rectifying and smoothing circuit includes a rectifying diode and a smoothing capacitor. The second rectifying and smoothing circuit includes a rectifying diode and a smoothing capacitor. In a closed circuit composed of the first rectifying and smoothing circuit and second rectifying and smoothing circuit which are connected by a transformer, leakage inductance between the primary winding and secondary winding of the transformer is caused to resonate with the first or second rectifying and smoothing circuit so that a resonance current due to the resonance is taken as the current from the secondary winding to restrict occurrence of noise.

4 Claims, 11 Drawing Sheets

F I G. 1
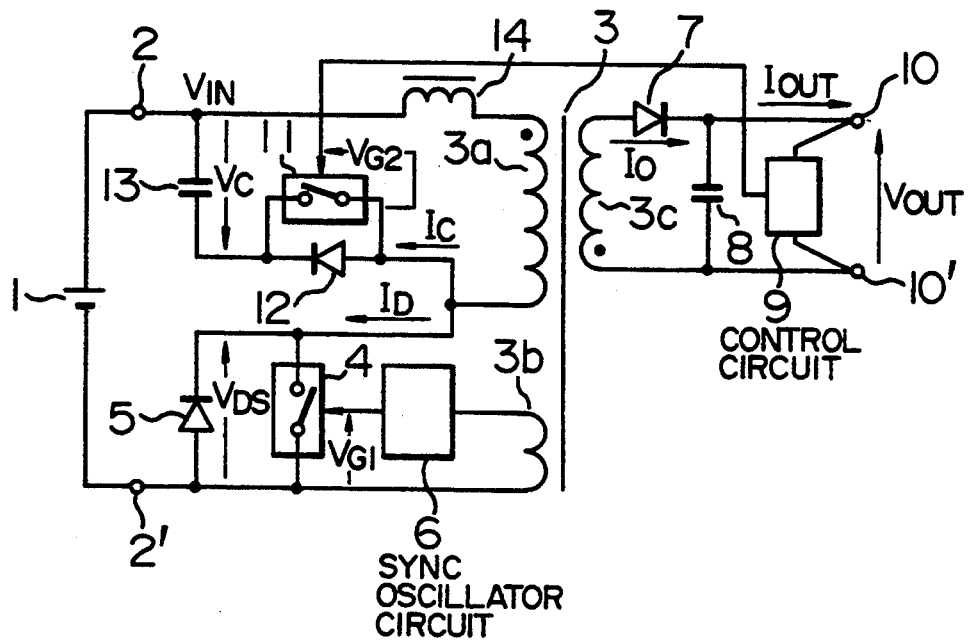
F I G. 3
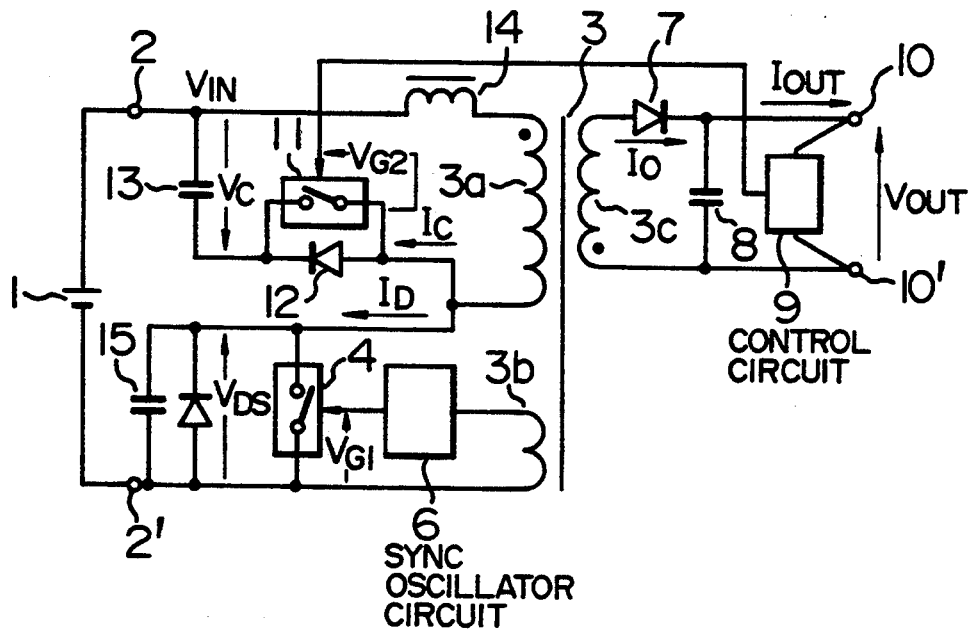

REGENERATIVE CONTROL TYPE SWITCHING POWER SOURCE DEVICE

BACKGROUND OF THE INVENTION

1. Field of the Invention

The present invention relates to a switching power source device for supplying a DC stabilized voltage to industrial or household electronic appliances.

2. Description of the Related Art

In recent years, with development of low price, downsizing, high performance and energy saving in electronic equipment, a switching power source device has been required to be small in size, high in output stability and high in efficiency. Prior art switching power source devices will be explained below.

Traditionally, for such a switching power source device, a self-exciting flyback type switching power source device, which has few components and can be fabricated at low cost, has been generally used widely. However, as well known, this type of device has the problem that the switching frequency is greatly changed by an output current so that interference for electronic equipment is generated and a large rectifying and smoothing circuit is required.

In order to solve the above problem in the prior art, a regenerative controlled type of switching power source device as shown in FIG. 9 has been developed. In FIG. 9, reference numeral 1 denotes an input DC power source which can be obtained by rectifying and smoothing an AC voltage or may be constructed by a battery. The DC power source 1 supplies an input voltage between input terminals 2 and 2' so that a positive voltage is connected with the input terminal 2 while a negative voltage is connected with the input terminal 2'. Reference numeral 3 denotes a transformer in which a primary winding 3a has one end connected with the input terminal 2 and the other end connected with the input terminal 2' through a switching element 4, a secondary winding 3c has one end connected with an output terminal 10' and the other end connected with an output terminal 10 through a diode 7, and a bias winding 3b has one end connected with the input terminal 2' and the other end connected with a sync oscillator circuit 6. Reference numeral 4 denotes the switching element which is turned on or off by the on/off signal supplied to its control terminal from the sync oscillator circuit 6 to apply the input voltage to the primary winding 3a or cut off it.

The sync oscillator 6 causes the switching element 4 to perform an ON operation during its predetermined ON period and causes the element to perform an OFF operation so that its OFF period continues until the polarity of the voltage induced in the bias winding 3b is reversed, and continues oscillation by repetition of the ON/OFF operation. Reference numeral 18 denotes a secondary switching element. The energy stored in the transformer 3 during the ON period of the switching element 4 is discharged, during the OFF period of the switching element 4, through the secondary winding 3c from a rectifying diode 7 or the secondary switching element 18 into a smoothing capacitor 8. Thereafter, in reverse, a secondary current is caused to flow backward from the smoothing capacitor 8 to the secondary winding 3c through the secondary switching element 18. With the aid of a control circuit 19, the secondary switching element 18 serves to control the backflow period while the secondary current flows. Reference numeral 7 denotes a rectifying diode with its anode side connected with the one end of the secondary winding 3c and its cathode side connected with an output terminal 10. Reference numeral 8 denotes a smoothing capacitor which is connected between the output terminals 10 and 10'. The rectifying diode 7 rectifies the voltage induced in the secondary winding 3c and the smoothing capacitor 8 smooths the rectified voltage to provide an output voltage. The control circuit 19 detects the output voltage between the output terminals 10 and 10' and compares it with an internal reference voltage to change the backflow period while the secondary current is caused to flow through the secondary switching element 18.

Now also referring to FIG. 10, a detailed explanation will be given of the operation of the device of FIG. 9. In FIG. 10, (a) shows the voltage waveform $V_{DS}$ across the switching element 4; (b) shows the waveform of the primary current flowing through the primary winding 3a; (c) shows the waveform of the driving pulse $V_{G1}$ in the sync oscillator circuit 6; (d) shows the waveform of the secondary current $I_D$ flowing through the second winding 3c; (e) shows the waveform of the driving pulse $V_{G2}$ for the secondary switching element 18 in which the shaded period during the OFF period represents the backflow period while the secondary current is caused to flow toward the secondary winding 3c.

The primary current flowing through the primary winding 3a during the ON period of the switching element 4, which operates during the ON period determined by the sync oscillator circuit 6, generates magnetic flux in the transformer 3 to store energy in it. Then, an induced voltage is generated in the secondary winding 3c of the transformer 3. The induced voltage is so adapted that it reverse-biases the rectifying diode 7 and places the secondary switching element 18 in an n"OFF" state.

When the OFF signal from the sync oscillator circuit 6 turns off the switching element 4, a flyback voltage is generated in the primary winding 3a and also generated in the secondary winding 3c. As a result, the voltage is applied to the rectifying diode 7 in its forward-biasing direction so that the energy stored in the transformer 3 is discharged as a secondary current through the secondary winding 3c and smoothed by the smoothing capacitor 8 so that the resultant voltage is applied between the output terminals 10 and 10' as an output voltage. Then, the control circuit 19 turns on the second switching element 18, but no particular change in the operation occurs according to the path through which the secondary current flows.

When the energy stored in the transformer 3 is discharged completely so that the secondary current becomes zero, the voltage across the smoothing capacitor 8, i.e., the output voltage is applied to the secondary winding 3c through the secondary switching element 18 already turned on. Thus, the secondary current flows in a backward direction from the smoothing capacitor 8 so that the magnetic flux in the direction opposite to the previous case is generated in the transformer 3 so as to store energy in it.

In this state, the polarity of the induced voltage in each of the wirings of the transformer 3 does not change so that the flyback voltage in the bias winding 3b does not also change. The sync oscillator circuit 6 maintains the OFF period of the switching element 4. When the secondary switching element 18, the ON period of which is controlled by the control circuit 19, turns off, the polarity of the induced voltage generated in each of the winding is reversed. Thus, the induced voltage generated in the secondary winding 3c reverse-biases the rectifying diode 7. Then, the secondary switching element 18 is also "OFF". So the secondary winding current ceases to flow. The induced voltage in the primary winding 3a is generated in such a direction that the connection end of the switching element 4 is at a negative voltage and that of the input terminal 2 is at a positive voltage. Thus, the primary current flows in such a direction that the input DC power source 1 is charged through the diode 5 so that the energy in the transformer 3 stored during the OFF period is returned as power to the input DC power source 1.

Then, since the polarity of the induced voltage generated in the bias winding 3b changes, the sync oscillator circuit 6 turns on the switching element 4, but no particular change in the operation occurs according to the path through which the primary current flows. When the energy stored in the transformer 3 during the OFF period is discharged completely so that the primary current becomes zero, the primary current flows in the charging direction opposite to the above case from the input DC power source 1 through the switching element 4 already turned on. Thus, magnetic flux is generated in the transformer 3 so as to store energy in it. In this state, the polarity of the induced voltage generated in each of the windings of the transformer 3 is not changed so that the sync oscillator circuit 6 maintains the ON state of the switching element 4. When the switching element 4 which operates during the ON period determined by the sync oscillator 6 turns off, the energy stored in the transformer 3 is discharged as the secondary current through the secondary winding 3c. If the above operations are repeated, the output voltage is continuously supplied from the output terminals 10 and 10'.

A detailed explanation will be given of the operation of controlling the output voltage so as to be stable. FIG. 10 shows respective operation waveforms of the indicated voltages and currents. Now it is assumed that the OFF period (t1–t3) of the driving pulse waveform $V_{G1}$ in the sync oscillator circuit 6 is $T_{OFF}$ and the backflow period of the secondary current $I_O$ within it is $T'_{OFF}$ while the ON period thereof (t3–t5) is $T_{ON}$ and the return period (t3–t4) of the primary current $I_D$ within it is $T'_{ON}$. The output current $I_{OUT}$ supplied from the output terminals 10–10' can be described by $$I_{OUT} = \frac{1}{2} \times V_{OUT} \times \frac{1}{L_s} \times \frac{T_{OFF}}{T} (T_{OFF} - 2 T_{OFF}'). \quad (1)$$

The output voltage $V_{OUT}$ can be represented by $$V_{OUT} = V_{IN} \times \frac{N_S}{N_P} \times \frac{T_{ON}}{T_{OFF}} = V_{IN} \times \frac{N_S}{N_P} \times \frac{T_{ON}'}{T_{OFF}'} = \quad (2)$$

$$V_{IN} \times \frac{N_S}{N_P} \times \frac{T_{ON} - T_{ON}'}{T_{OFF} - T_{OFF}'}$$

The oscillation frequency f can be described by $$f = \frac{1}{T_{ON} + T_{OFF}} = \frac{1}{T}. \quad (3)$$

In these equations, $N_S$ denotes the number of wirings of the secondary winding 3c, $N_P$ denotes the number of windings of the primary winding 3a, $L_S$ denotes the inductance value of the secondary winding 3c, $V_{IN}$ denotes the input voltage supplied from the DC power source 1, $T_{ON}$ denotes the ON period of the switching element 4, $T_{OFF}$ denotes the OFF period of the switching element 4 and T denotes an oscillation period.

Since the ON period $T_{ON}$ is fixed to the constant value determined by the sync oscillator circuit 6, if the output voltage $V_{OUT}$ is constant, the OFF period is constant and the oscillation frequency is also constant. However, since the backflow period $T'_{OFF}$ can be varied by the switching element 18 which is controlled by the control circuit 19, when the output current $I_{OUT}$ varies, the output voltage $V_{OUT}$ can be controlled by varying the backflow period $T'_{OFF}$ as understood from Equation (1). The output voltage $V_{OUT}$ can be also controlled for a variation in the input voltage $V_{IN}$ by varying the backflow period $T'_{OFF}$ as understood from Equation (2). Thus, the control voltage $V_{OUT}$ can be controlled so as to be always constant by controlling the backflow period $T'_{OFF}$ in such a manner that the ON period of the secondary switching element 18 is controlled by the control circuit 19.

FIG. 11 corresponding to FIG. 10 show respective operation waveforms when the output current $I_{OUT}$ varies. In FIG. 11, like parts which will not be explained here refer to like parts in FIG. 10. In FIG. 11, solid lines refer to a so-called maximum load case when the maximum output current $I_{OUT}$ flows from the output terminals 10–10' whereas broken lines refer to a so-called no load case when the output current $I_{OUT}$ is zero. If the input voltage is constant, the $T_{ON}$ period is also constant so that the changing width ΔB in the magnetic flux is constant.

When the switching element 4 turns off, the surge voltage due to the leakage inductance in the transformer 3 is generated. Where the maximum load is applied, the degree of the surge voltage is similar to the case of the conventional flyback-type switching power source device; on the other hand, where small load is applied, the peak value of the primary current immediately before turn-off is large so that it is larger than the above conventional power source device.

In the case of the regenerative type switching power source device, because of the energy regenerative capability of the switching element 4 when it turns on, the snubber capacitor connected across the switching element 4 does not constitute a turn-on loss but can effectively restrain the surge voltage in the turn-on. But, resonance energy of the snubber capacitor and the leakage inductance in the transformer 3 becomes large so that a ringing waveform is superposed on the voltage across the switching element 4 during the OFF period and constitutes a noise source. The addition of such a snubber capacitor having a larger capacitance hinders the switching frequency from being higher frequency desirable for downsizing the power source.

As the second prior art, the switching power supply device in a primary side regenerative system as shown in FIG. 12 has been developed. In FIG. 12, like reference numerals which will not explained here in detail designate like parts in FIG. 9 described above. Numeral 1 denotes a DC power source; 2–2' input terminals; 3 a transformer having a primary winding 3a, a secondary winding 3b and a bias winding 3c; 4 a switching element; 5 a diode; 6 a sync oscillator circuit; 7 a rectifying diode; and 8 a smoothing capacitor. The diode 7 and smoothing capacitor 8 constitute a first rectifying and smoothing circuit. Numeral 9 denotes a control circuit and 10-10' denote output terminals.

Numeral 12 denotes a rectifying diode and 13 denotes a smoothing capacitor. The rectifying diode 12 has an anode connected with the connection point between the primary winding 3a and the switching element 4 and a cathode connected with the one end of the smoothing capacitor 13 so that the primary winding 3a, rectifying diode 12 and smoothing capacitor 13 constitute a closed circuit. Numeral 11 denotes a second switching element which is connected in parallel with the rectifying diode 12 and on-off controlled by the control circuit 9. Incidentally, within the control circuit 9, the part connected with the output terminals and the part for driving the switching element 11 are separated from each other.

Referring to FIG. 13 showing the waveform charts at the various parts of the switching power source device, its operation will be explained. In FIG. 13, (a) shows the voltage waveform $V_{DS}$ across the switching element 4; (b) shows the waveform of the primary current flowing $I_D$ through the switching element 4 or diode 5; (c) shows the waveform of the driving pulse $V_{G1}$ in the sync oscillator circuit 6; (d) shows the waveform of the primary current $I_C$ flowing through the switching element 11 or rectifying diode 12; (e) shows the waveform of the driving pulse $V_{G2}$ for the switching element 11; (f) shows the secondary current $I_O$ flowing through the secondary winding 3c; and (g) shows the changes in the magnetic flux $\Phi$ in the transformer 3.

The primary current $I_D$ flowing through the primary winding 3a during the ON period of the switching element 4, which operates during the ON period determined by the sync oscillator circuit 6, generates magnetic flux in the transformer 3 to store energy in it. Then, an induced voltage is generated in the secondary winding 3c of the transformer 3. The induced voltage is so adapted that it reverse-biases the rectifying diode 7. The rectifying diode 12 is also reverse-biased and the switching element 11 in an "OFF" state.

When the OFF signal from the sync oscillator circuit 6 turns off the switching element 4, a flyback voltage is generated in the primary winding 3a to forward-bias the rectifying diode 12 and also generated in the secondary winding 3c so that the voltage is applied to the rectifying diode 7 in its forward-biasing direction. Thus, the energy stored in the transformer 3 is discharged as a primary current $I_C$ through the primary winding 3a and rectifying diode 12 and the current is smoothed by the smoothing capacitor 13 to provide a DC voltage $V_C$. The energy is also discharged as a secondary current $I_O$ through the secondary winding 3c and the current is smoothed by the smoothing capacitor 8 to be supplied to the output terminals 10-10' as an output voltage $V_{OUT}$.

Then, the control circuit 9 turns on the second switching element 11, but any particular change in the operation does not occur if the primary current $I_D$ flows through either the rectifying diode 12 or switching element 11. Taking no account of the capacitance component such as parasitic capacitance, when the switching element 4 turns off and the polarity of the voltage in each of the windings of the transformer 3 is reversed, the energy stored in the transformer 3 is discharged first from the primary winding 3a under the influence of leakage inductance. Specifically, the primary current $I_C$ start to flow from the initial value of the final value $I_P$ of the primary current $I_D$, and the secondary current $I_O$ rises from zero.

Then, the magnetic flux $\Phi$ in the transformer 3 decrease linearly because the stored energy is discharged with the DC voltage applied to the primary winding 3a. Correspondingly, the primary current $I_C$ decreases monotonously and eventually becomes 0 A. But since the switching element 11 is "ON", now conversely, the current discharged from the smoothing capacitor 13 flows through the switching element 11. Since the DC voltage $V_C$ has been applied to the primary winding 3a, the rectifying diode 7 is forward-biased and so the secondary current $I_O$ continues to flow. Also after the energy stored in the transformer 3 has been discharged during the ON period of the switching element 4, the DC voltage $V_C$ is applied through the switching element 11 to the transformer 3 so as to be reversely excited to store energy in the reverse direction.

When the switching element 11 is turned off the control circuit 9, the polarity of the voltage in each of the winding is reversed. Thus, the rectifying diode 7 is reverse-biased and so the secondary current $I_O$ ceases to flow. The induced voltage in the primary winding 3a is generated in such a direction that the connection end of the switching element 4 is at a negative voltage and that of the input terminal 2 is at a positive voltage. Thus, the primary current $I_D$ flows in such a direction that the input DC power source 1 is charged through the diode 5 so that the energy in the transformer 3 stored during the OFF period is returned as power to the input DC power source 1.

Then, since the polarity of the induced voltage generated in the bias winding 3b changes, the sync oscillator circuit 6 turns on the switching element 4, but no particular change in the operation occurs according to the path through which the primary current $I_D$ flows. When the energy stored in the transformer 3 during the OFF period is discharged completely so that the primary current becomes zero, the primary current $I_D$ flows in the charging direction opposite to the above case from the input DC power source 1 through the switching element 4 already turned on. Thus, magnetic flux is generated in the transformer 3 so as to store energy in it.

In this state, the polarity of the induced voltage generated in each of the windings of the transformer 3 is not changed so that the sync oscillator circuit 6 maintains the ON state of the switching element 4. When the switching element 4 which operates during the ON period determined by the sync oscillator circuit 6 turns off, the energy stored in the transformer 3 is discharged toward the smoothing capacitor 13 through the primary winding 3a and as the secondary current $I_O$ through the secondary winding 3c. If the above operations are repeated, the output voltage is continuously supplied from the output terminals 10-10'.

A detailed explanation will be given of the operation of controlling the output voltage so as to be stable. FIG. 13 shows various operation waveforms. Now it is assumed that the OFF period (t1-t3) of the driving pulse waveform $V_{G1}$ in the sync oscillator circuit 6 is $T_{OFF}$ and the reverse excitation period (t2-t3) of the transformer 3 within $T_{OFF}$ is $T'_{OFF}$ while the ON period thereof (t3-t5) is $T_{ON}$ and the regenerative period (t3-t4) of the primary current $I_D$ within $T_{ON}$ is $T'_{ON}$. During the stabilizing operation of the switching power source device according to the present invention, the DC voltage $V_C$ does not almost vary because the capacitance of the smoothing capacitor 13 is sufficiently large, and the ripple current therefrom, i.e., the primary current $I_{ON}$ during the OFF period is 0A in average because the charging and discharging current are equal to each other. Thus, the energy from the second wiring 3c and supplied from the output terminals 10-10' is equal to a difference between the energy stored in the transformer 3 during the ON period and the energy returned to the input DC power source 1 during the $T'_{ON}$ period.

On the other hand, it is apparent that the DC voltage $V_C$ is described by the following Equation (4) as long as the DC voltage $V_C$ is taken as the output voltage with no load in the operation of stabilizing the output voltage from the regenerative control type switching power source device which has been explained as the prior art.

$$VC = \frac{T_{ON}}{T_{OFF}} \times V_{IN} = \frac{T_{ON}'}{T_{OFF}'} \times V_{IN} \quad (4)$$

Further, since the output voltage $V_{OUT}$ from the switching power source, which is obtained by rectifying the flyback voltage in the secondary winding 3c, can be regulated by changing the DC voltage $V_C$ as described by Equation (5)

$$V_{OUT} = \frac{N_S}{N_P} \times V_C \quad (5)$$

For example, when the output current $I_{OUT}$ decreases and the output voltage $V_{OUT}$ increases, the ON period of the switching element 11 (i.e., the OFF period $T_{OFF}$ of the switching element 4) is lengthened by the control circuit 9, thus the DC voltage $V_C$ decreases because the charge discharged from the smoothing capacitor 13 is larger than the charge charged therein. While the output voltage $V_{OUT}$ decreases corresponding to decrease of the DC voltage $V_C$, the gradient of the primary current $I_C$ is relaxed because the voltage $V_C$ generated in and applied to the winding of the transformer 3 during the OFF period decreases. Thus, the DC voltage $V_C$ eventually settles down at such a value that the output voltage $V_{OUT}$ becomes a prescribed voltage. As a result, the output voltage $V_{OUT}$ can be stabilized by regulating the ON period of the switching element 11.

The DC voltage $V_C$ requires essentially small change for correcting the change (load regulation) in the output voltage $V_{OUT}$ due to the change in the output current $I_{OUT}$. Thus, if the ON period $T_{ON}$ is fixed, the OFF period $T_{OFF}$ does not almost vary, and the switching frequency and the changing width $\Delta B$ in the magnetic flux are also almost fixed. This way is shown in broken lines in FIG. 13. The above arrangement of this prior art can efficiently restrain the surge voltage in turn-off of the switching element and ringing waveform during the OFF period without impairing the efficiency of the regenerative control type switching power source device which can restrain a change in the switching frequency due to the change in load.

But, the prior art arrangements have the following defects. The current flowing through the secondary winding 3c of the transformer 3 and the diode 7 rises from zero in turn-off of the switching element 4 to supply power to the smoothing capacitor 8 and output terminals 10-10'. This current becomes instantaneously zero when the diode 7 is turned off by the voltage induced in the secondary winding 3c of the transformer 3 simultaneously with turn-off of the switching element 11. Then, recovery occurs in the diode 7; it constitutes a noise source and also provides loss which hinders a desirable higher switching frequency required for downsizing the power source.

SUMMARY OF THE INVENTION

An object of the invention is to solve the problems involved with the prior art and to provide a low-noise high-efficiency regenerative control type switching power source device which can restrain occurrence of recovery without impairing its efficiency that it can restrain a change in the switching frequency due to the change in load.

In order to attain the above object, in accordance with the present invention, there is provided a switching power source device including a first switching means for repeatedly switching on-off; a transformer having a primary winding and at least one secondary winding; a first rectifying and smoothing means for applying an input voltage to the primary winding of the transformer when the first switching means is ON thereby to store energy in the transformer and acquiring an output from the energy discharged from the secondary winding of the transformer when the first switching means is OFF; a second rectifying and smoothing means for acquiring a DC voltage from energy discharged from the primary winding or another winding of the transformer when the first switching means is OFF; and a second switching means for repeatedly switching on-off alternately with the first switching means, wherein the DC voltage is applied through the second switching means to the primary winding or an auxiliary winding of the transformer to store energy in the transformer, the energy stored in the transformer is returned from the primary winding of the transformer to the input voltage when the second switching means is OFF, and the output voltage is controlled by changing the on-off ratio in the first and second switching means, and wherein in the closed circuit composed of the first and second rectifying and smoothing means which are connected by the transformer, leakage inductance of the primary winding or auxiliary winding of the transformer or an externally attached inductance is caused to resonate with the first or second rectifying and smoothing means or both of them so that the resonance current due to the resonance is taken as the current of the secondary winding.

In the above arrangement, the current flowing through the secondary winding and the second rectifying and smoothing means rises from zero, but because of resonance phenomenon, after passing a peak, it decreases to zero again. Thus, when the first switch means turns on to reverse-bias the second rectifying and smoothing means, the input current to the second rectifying and smoothing means can be reduced down to zero, and occurrence of recovery can be restrained. The current flowing through the primary winding or auxiliary winding of the transformer and that flowing through the secondary winding thereof take a smooth waveform so that noise occurrence can be restrained.

BRIEF DESCRIPTION OF THE DRAWINGS

FIG. 1 is a circuit diagram of the switching power device according to the first embodiment of the present invention;

FIG. 3 is a circuit diagram of the switching power device according to the second embodiment of the present invention;

DESCRIPTION OF THE PREFERRED EMBODIMENTS

Embodiment 1

Figure 9:
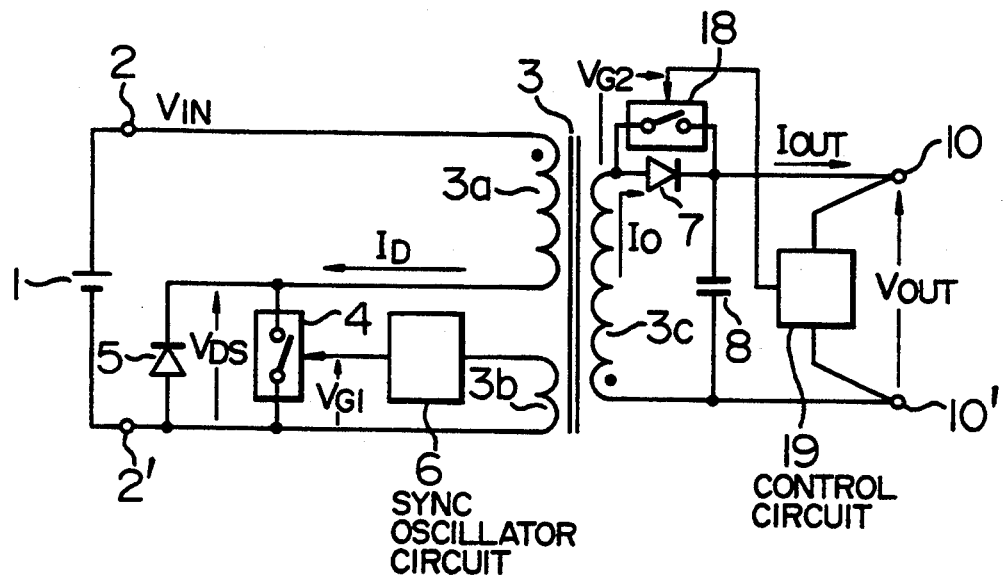
FIG. 9 is a circuit diagram of the switching power device according to the first prior art.
Figure 12:
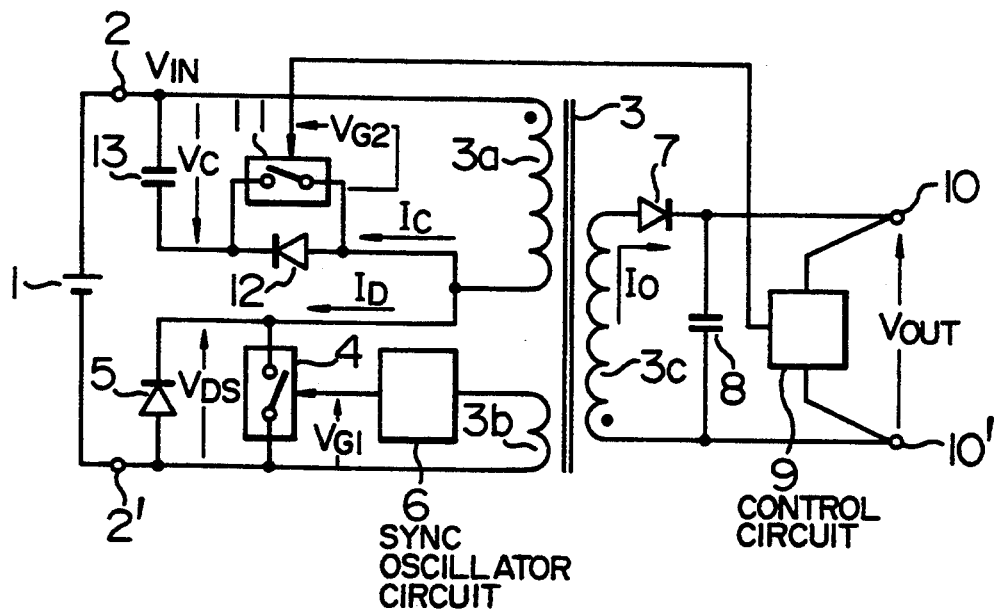
FIG. 12 is a circuit diagram of the switching power device according to the second prior art.
Figure 10:
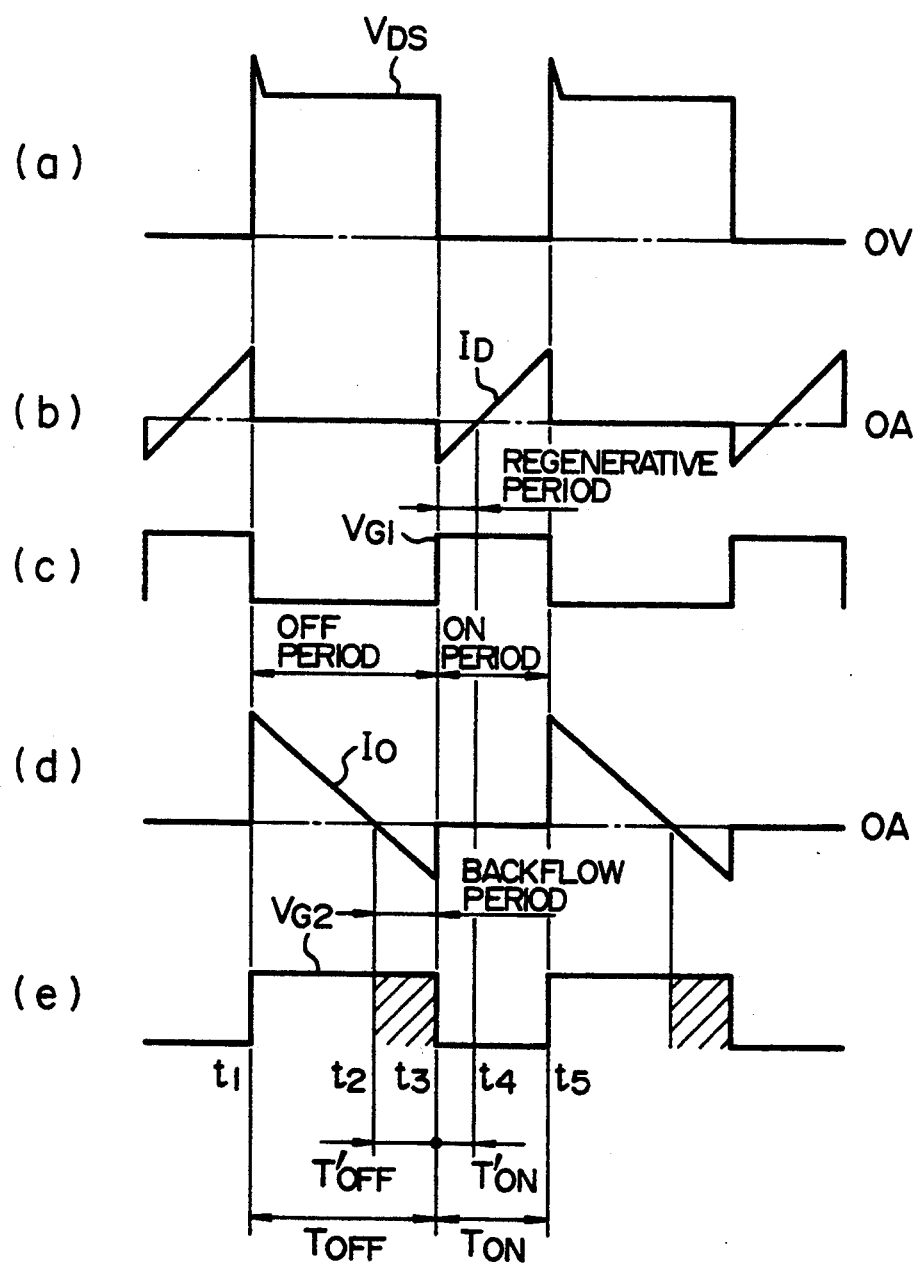
FIG. 10 shows waveform charts for explaining several operation waveforms in the circuit of FIG. 9.
Figure 11:
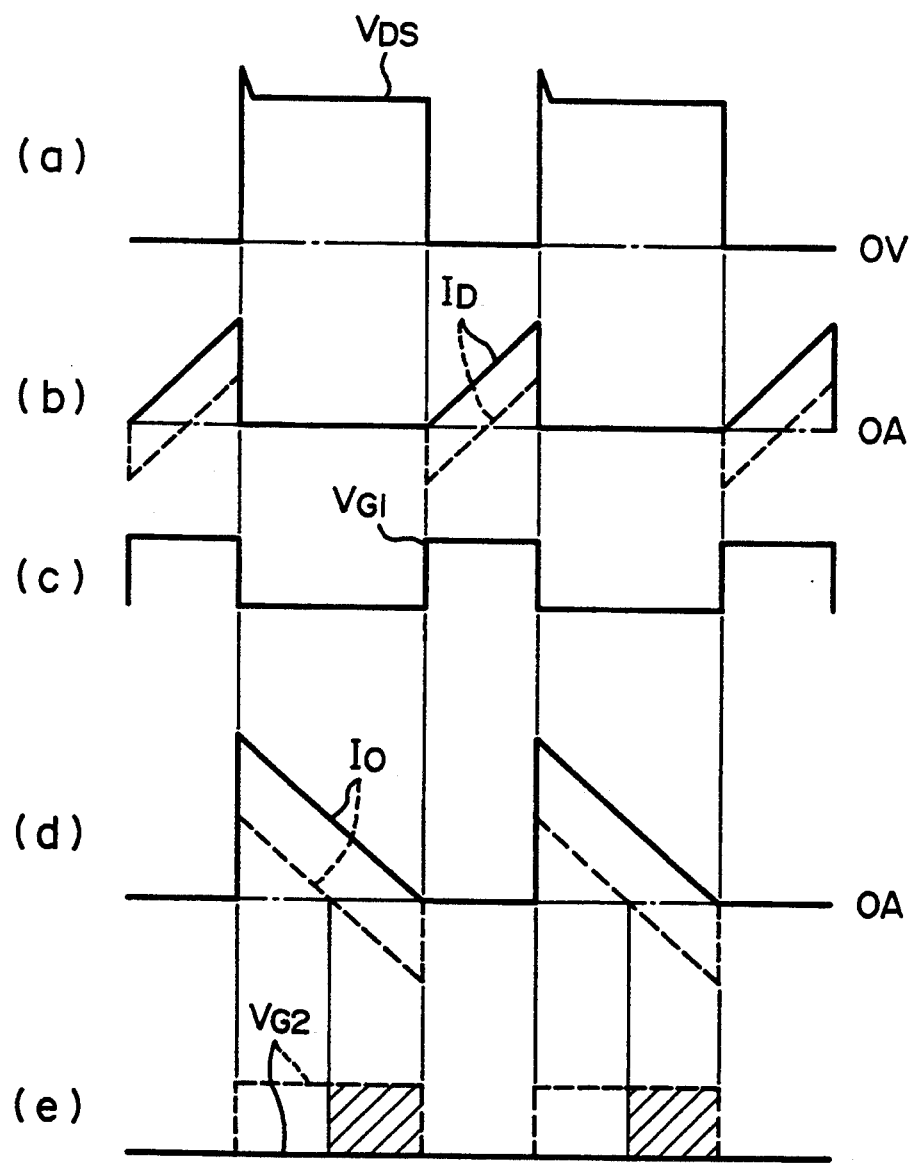
FIG. 11 shows other waveform charts for explaining several operation waveforms in the circuit of FIG. 9.
Figure 13:
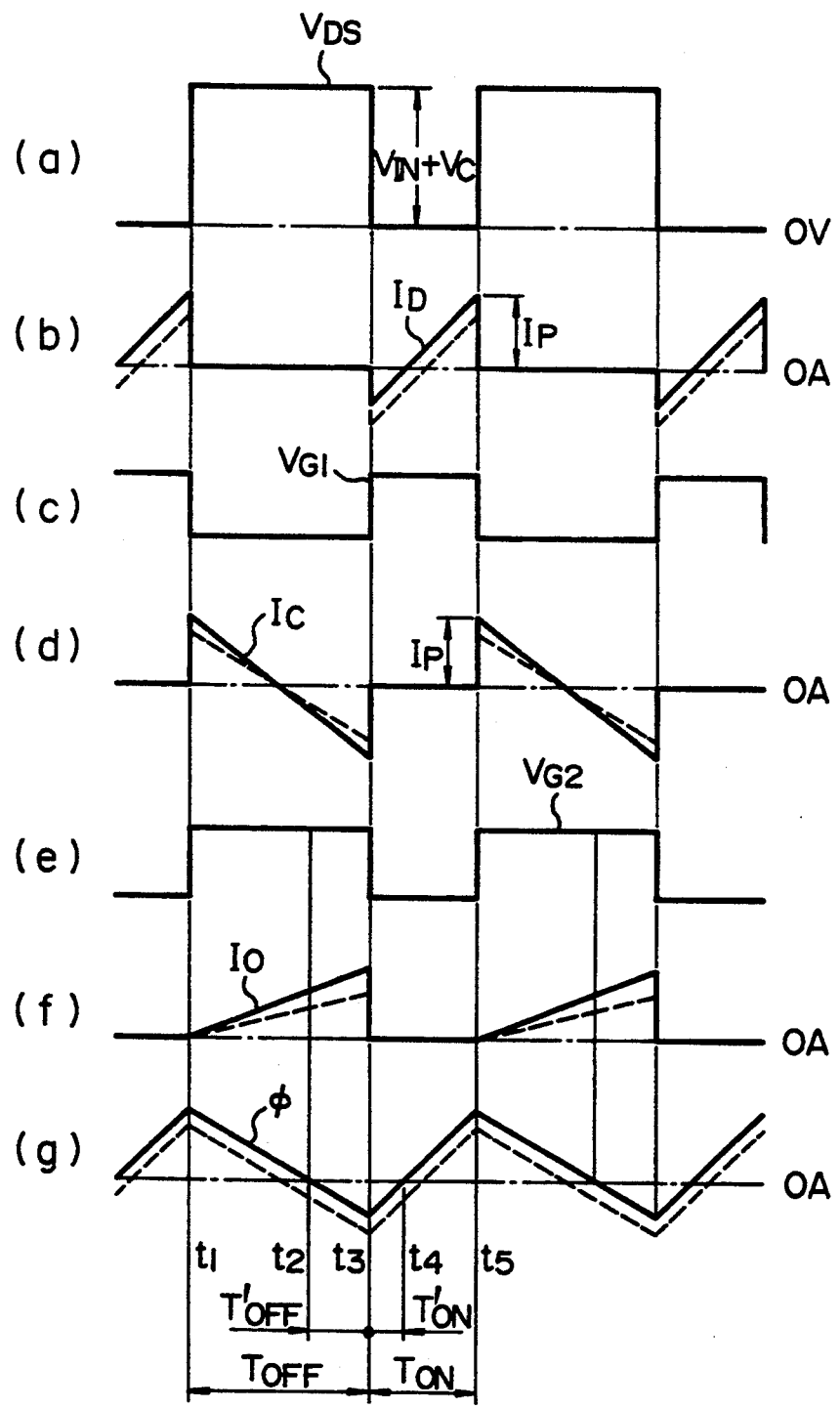
FIG. 13 shows waveform charts for explaining several operation waveforms in the circuit of FIG. 12.

Now referring to FIGS. 1 and 2, an explanation will be given of the first embodiment of the present invention. FIG. 1 shows an arrangement of the switching power source device according to the first embodiment of the present invention. In FIG. 1, like reference numerals which will not explained here in detail designate like parts in FIG. 9. Numeral 1 denotes a DC power source; 2-2' input terminals; 3 a transformer having a primary winding 3a, a secondary winding 3c and a bias winding 3b; 4 a switching element serving as a first switching means; 5 a diode; 6 a sync oscillator circuit; 7 a rectifying diode; and 8 a smoothing capacitor. The diode 7 and smoothing capacitor 8 constitute a first rectifying and smoothing circuit. Numeral 9 denotes a control circuit and 10-10' denote output terminals.

Numeral 11 denotes a switching element serving as a first switching means which is on-off controlled by the control circuit 9. Within the control circuit 9, the part connected with the output terminals 10-10' and the part for driving the switching element 11 are separated from each other. Numeral 12 denotes a rectifying diode and 13 denotes a smoothing capacitor. The rectifying diode 12 and smoothing capacitor 13 constitute a second rectifying and smoothing circuit. Numeral 14 denotes leakage inductance between the primary winding 3a and secondary winding 3c of the transformer 3 or an externally attached inductance element. The smoothing capacitor 13 and the leakage inductance or inductance element 14 are set to resonate with each other so that the current waveform of the rectifying diode 7 is sinusoidal.

Figure 2:
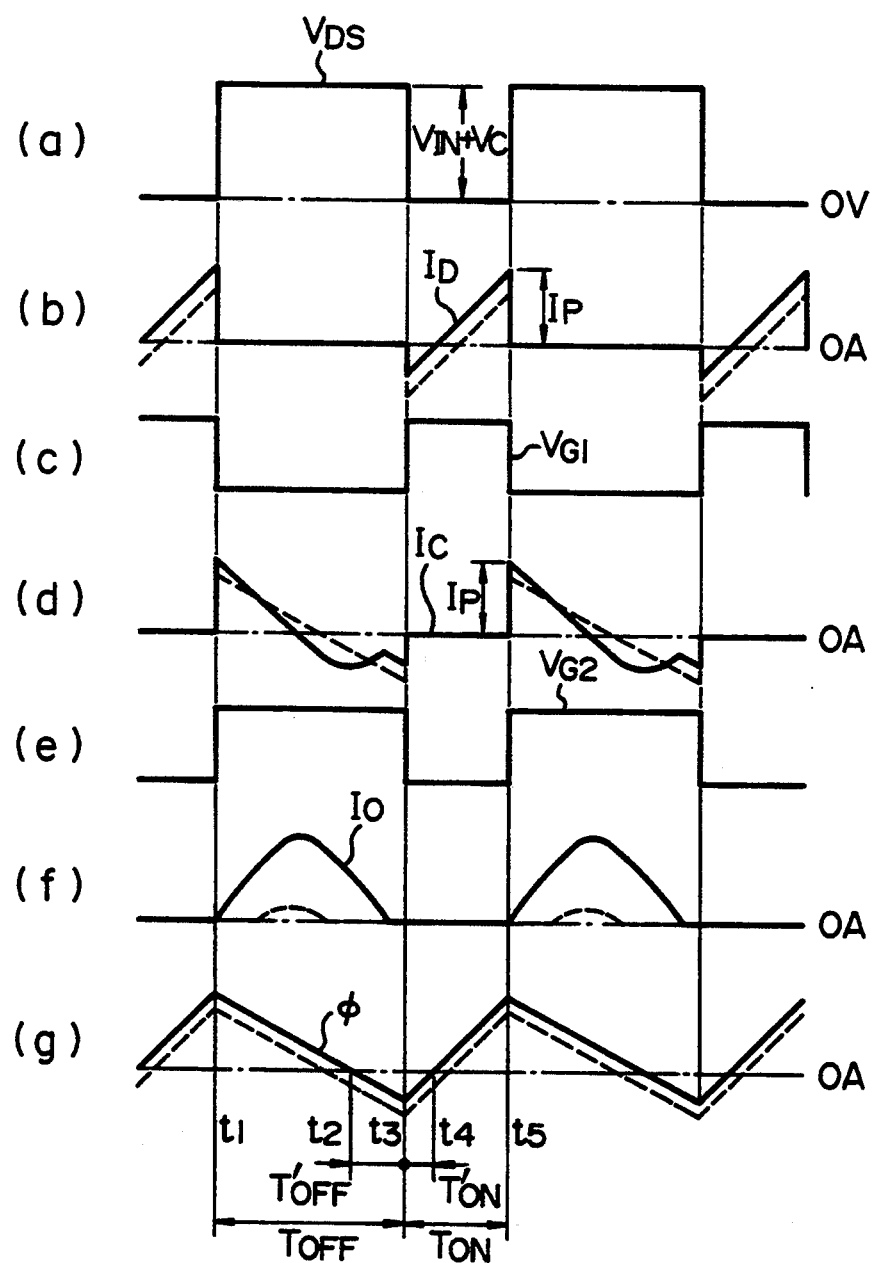
FIG. 2 shows waveform charts for explaining several operation waveforms in the circuit of FIG. 1.

Referring to FIG. 2 showing the waveform charts at the various parts of the switching power source device, its operation will be explained.

In FIG. 2, (a) shows the voltage waveform $V_{DS}$ across the switching element 4; (b) shows the waveform of the primary current $I_D$ flowing through the switching element 4 or diode 5; (c) shows the waveform of the driving pulse $V_{G1}$ for the switching element 4 in the sync oscillator circuit 6; (d) shows the waveform of the primary current $I_C$ flowing through the switching element 11 or rectifying diode 12; (e) shows the waveform of the driving pulse $V_{G2}$ for the switching element 11; (f) shows the secondary current $I_O$ flowing through the secondary winding 3c; and (g) shows the changes in the magnetic flux $\Phi$ in the transformer 3.

The primary current $I_D$ flowing through the primary winding 3a during the ON period of the switching element 4, which operates during the ON period determined by the sync oscillator circuit 6, generates magnetic flux in the transformer 3 to store energy in it. Then, an induced voltage is generated in the secondary winding 3c of the transformer 3. The induced voltage is so adapted that it reverse-biases the rectifying diode 7. The rectifying diode 12 on the primary winding side is also reverse-biased and the switching element 11 is in an "OFF" state.

When the OFF signal from the sync oscillator circuit 6 turns off the switching element 4, a flyback voltage is generated in the primary winding 3a to forward-bias the rectifying diode 12 and also generated in the secondary winding 3c so that the voltage is applied to the rectifying diode 7 in its forward-biasing direction. Thus, the energy stored in the transformer 3 is discharged as a primary current $I_C$ through the primary winding 3a and rectifying diode 12 and the current is smoothed by the smoothing capacitor 13 to provide a DC voltage $V_C$. The energy is also discharged as a secondary current $I_O$ through the secondary winding 3c and the current is smoothed by the smoothing capacitor 8 to be supplied to the output terminals 10-10' as an output voltage $V_{OUT}$.

Then, the control circuit 9 turns on the second switching element 11, but any particular change in the operation does not occur if the primary current flows through either the rectifying diode 12 or switching element 11. Taking no account of the capacitance component such as parasitic capacitance, when the switching element 4 turns off and the polarity of the voltage in each of the windings of the transformer 3 is reversed, the energy stored in the transformer 3 is discharged first from the primary winding 3a under the influence of leakage inductance in the transformer 3. Specifically, the primary current $I_C$ start to flow from the initial value of the final value $I_P$ of the primary current $I_D$, and the secondary current $I_O$ rises from zero.

Then, since the rectifying diodes 7 and 12 are "ON", the current flowing through each winding is a transient current in the closed circuit composed of the smoothing capacitor 13, leakage inductance or inductance element 14 and smoothing capacitor 8 which are connected through the primary winding 3a and secondary winding 3c. This current, since the resonance frequency of the capacitor 13 and the leakage inductance or inductance is set for a sufficiently small value, becomes a sinusoidal resonance current. Then, since the stored energy is discharged from the transformer 3 with the DC voltage $V_C$ applied to the primary winding 3a, the magnetic flux $\Phi$ in the transformer 3 decreases linearly. The secondary winding current $I_O$ is the sum of the excitation current inducing the magnetic flux $\Phi$ and the primary winding current which is the resonance current.

Since the resonance period of the resonance current is set sufficiently small, the secondary winding current $I_O$ will decrease to zero before long to turn off the rectifying diode 7. When the smoothing diode is "ON", the sinusoidal resonance current flows as the primary winding current $I_C$; on the other hand, when the smoothing diode is "OFF", the resonance current disappears and only the excitation current flows. In the above process, the primary winding current $I_{OUT}$ becomes negative, but the switching element 11 is "ON" so that the resonance is maintained. Thus, now conversely, the current discharged from the smoothing capacitor 13 flows into the primary winding 3a through the switching element 11.

Also after the energy stored in the transformer 3 has been discharged during the ON period of the switching element 4, the DC voltage $V_C$ is applied through the switching element 11 to the transformer 3 so as to be reversely excited to store energy in the reverse direction.

When the switching element 11 is turned off by the control circuit 9, the polarity of the voltage in each of the winding is reversed and thus the induced voltage in the primary winding 3a is generated in such a direction that the connection end of the switching element 4 is at a negative voltage and that of the input terminal 2 is at a positive voltage. Thus, the primary current $I_D$ flows in such a direction that the input DC power source 1 is charged through the diode 5 so that the energy in the transformer 3 stored during the OFF period is returned as power to the input DC power source 1.

Then, the sync oscillator circuit 6 turns on the switching element 4, but no particular change in the operation occurs according to the path through which the primary current $I_D$ flows. When the energy stored in the transformer 3 during the OFF period is discharged completely so that the primary current becomes zero, the primary current $I_D$ flows in the charging direction opposite to the above case from the input DC power source 1 through the switching element 4 already turned on. Thus, magnetic flux is generated in the transformer 3 so as to store energy in it. In this state, the polarity of the induced voltage generated in each of the windings of the transformer 3 is not changed so that the sync oscillator circuit 6 maintains the ON state of the switching element 4. When the switching element 4 which operates during the ON period determined by the sync oscillator circuit 6 turns off, the energy stored in the transformer 3 is discharged toward the smoothing capacitor 13 through the primary winding 3a and discharged as the secondary current $I_O$ through the secondary winding 3c. If the above operations are repeated, the output voltage is continuously supplied from the output terminals 10–10'.

A detailed explanation will be given of the operation of controlling the output voltage so as to be stable. FIG. 2 shows various operation waveforms. Now it is assumed that the OFF period (t1–t3) of the driving pulse waveform $V_{G1}$ in the sync oscillator 6 is $T_{OFF}$ and the reverse excitation period (t2–t3) of the transformer 3 within it is $T'_{OFF}$ while the ON period thereof (t3–t5) is $T_{ON}$ and the return period (t3–t4) of the primary current $I_D$ within it is $T'_{ON}$.

During the stabilizing operation of the switching power source device according to the present invention, the DC voltage $V_C$ takes the sum of the DC component and the resonance voltage of the smoothing capacitor 13 and the leakage inductance or inductance On the other hand, the primary current $I_{ON}$ during the OFF period, i.e., the ripple current from the smoothing capacitor 13 has an average current of 0A because the charging and discharging currents are equal to each other. Thus, the energy from the second wiring 3c and supplied from the output terminals 10–10' is equal to a difference between the energy stored in the transformer 3 during the ON period and the energy returned to the input DC power source 1 during the $T'_{ON}$ period.

On the other hand, it is apparent that the DC voltage $V_C$ can be represented by Equation (4) as long as the DC voltage $V_C$ is taken as the output voltage with no load in the operation of stabilizing the output voltage from the regenerative control type switching power source device which has been explained as the prior art. Further, since the output voltage $V_{OUT}$ from the switching power source, which is obtained by rectifying the flyback voltage in the secondary winding 3c, can be regulated by changing the DC voltage $V_C$ the variation width of which can be made sufficiently small, as represented by Equation (5). Even if the variation width of $V_C$ is large, the output voltage $V_{OUT}$ can be regulated by the average value of $V_C$. For example, when the output current $I_{OUT}$ decreases and the output voltage $V_{OUT}$ increases, the ON period of the switching element 11 (i.e., the OFF period $T_{OFF}$ of the switching element 4) is lengthened by the control circuit 9, and the charge discharged from the smoothing capacitor 13 is larger than the charge charged therein so that the average value of the DC current $V_C$ decreases gradually. When the DC voltage $V_C$ decreases, the output voltage $V_{OUT}$ also decreases and the voltage $V_C$ generated in and applied to the winding of the transformer 3 during the OFF period decreases. Thus, the gradient of the primary current $I_C$ is also relaxed so that the DC voltage $V_C$ eventually settles down at such a value that the output voltage $V_{OUT}$ becomes a certain fixed voltage. As a result, the output voltage $V_{OUT}$ can be stabilized by regulating the ON period of the switching element 11. The DC voltage $V_C$ essentially requires small change to correct the change (load regulation) in the output voltage $V_{OUT}$ due to the change in the output current $I_{OUT}$. Thus, if the ON period $T_{ON}$ is fixed, the OFF period $T_{OFF}$ does not almost vary, and the switching frequency and the changing width $\Delta B$ in the magnetic flux are also almost fixed. This way is shown in broken lines in FIG. 2. The above arrangement of this embodiment, in which the capacitor 13 and diode 12 constitute a clamping circuit, has an advantage that the surge voltage due to turn-off of the switching element 4 in the first prior art is not produced.

Embodiment 2

Figure 4:
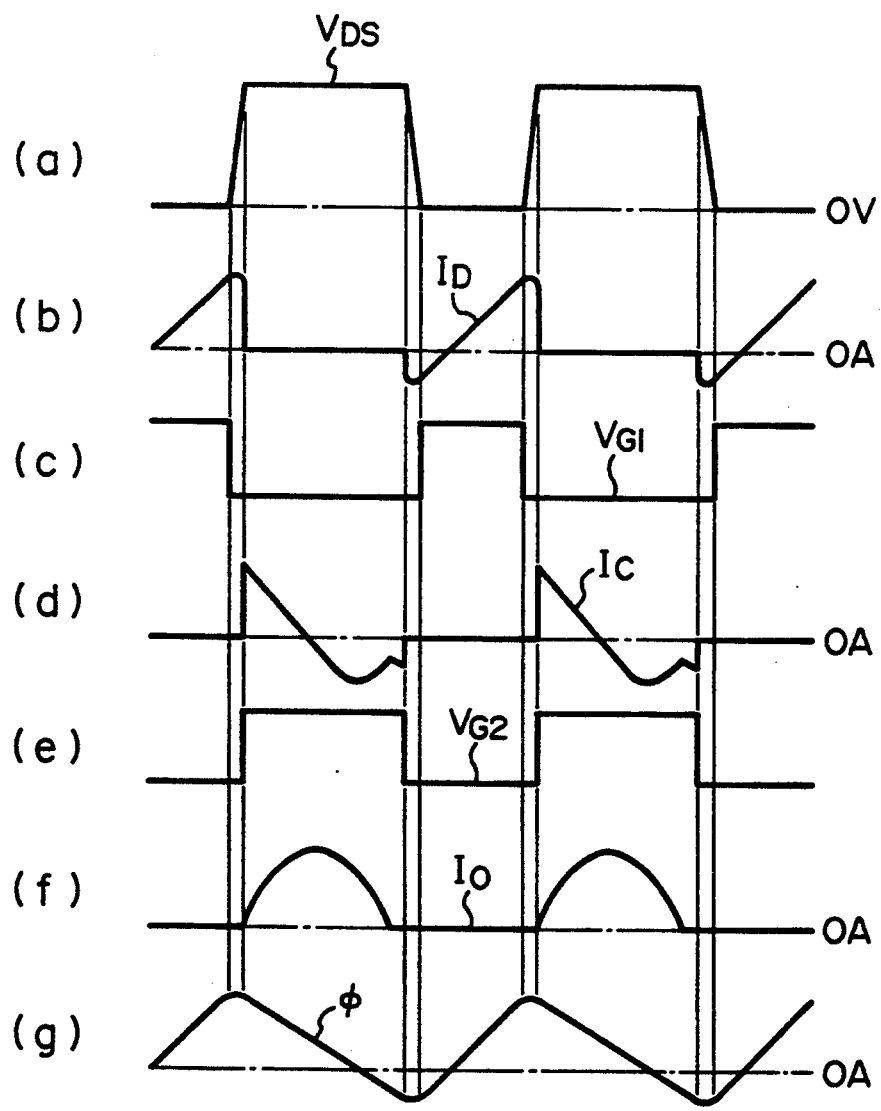
FIG. 4 shows waveform charts for explaining several operation waveforms in the circuit of FIG. 3.

Referring to FIGS. 3 and 4, the second embodiment will be explained. FIG. 3 shows an arrangement of the switching power source device according to the second embodiment of the present invention. In FIG. 3, like reference numerals which will not explained here in detail designate like parts in FIG. 9 described later. Numeral 1 denotes a DC power source; 2–2' input terminals; 3 a transformer having a primary winding 3a, a secondary winding 3c and a bias winding 3b; 4 a switching element serving as a first switching means; 5 a diode; 6 a sync oscillator circuit; 7 a rectifying diode; and 8 a smoothing capacitor. The diode 7 and smoothing capacitor 8 constitute a first rectifying and smoothing circuit. Numeral 9 denotes a control circuit and 10–10' denote output terminals.

Numeral 11 denotes a switching element serving as a first switching means which is on-off controlled by the control circuit 9. Within the control circuit 9, the part connected with the output terminals 10–10' and the part for driving the switching element 11 are separated from each other. Numeral 12 denotes a rectifying diode and 13 denotes a smoothing capacitor. The rectifying diode 12 and smoothing capacitor 13 constitute a second rectifying and smoothing circuit. Numeral 14 denotes leakage inductance between the primary winding 3a and secondary winding 3c of the transformer 3 or an externally attached inductance element. The smoothing capacitor 13 and the leakage inductance or inductance element 14 are set to resonate with each other so that the current waveform of the rectifying diode 7 is sinusoidal. Numeral 15 denotes a capacitor which is connected across the switching element 4 and serves to restrain an abrupt variations in the voltages applied to the switching element 4 and switching element 11. It should be noted that the on-off signals in the control circuit 9 and sync oscillator 6 are so set that the switching elements 4 and 11 have their concurrent OFF period.

Referring to FIG. 4 showing the waveform charts at the various parts of the switching power source device thus structured, its operation will be explained.

In FIG. 4, (a) shows the voltage waveform $V_{DS}$ across the switching element 4; (b) shows the waveform of the primary current $I_D$ flowing through the switching element 4 or diode 5; (c) shows the waveform of the driving pulse $V_{G1}$ for the switching element 4 in the sync oscillator circuit 6; (d) shows the waveform of the primary current $I_C$ flowing through the switching element 11 or rectifying diode 12; (e) shows the waveform of the driving pulse $V_{G2}$ for the switching element 11; (f) shows the secondary current $I_O$ flowing through the secondary winding 3c; and (g) shows the changes in the magnetic flux $\Phi$ in the transformer 3.

The basic operation according to this embodiment is the same as that in the circuit configuration according to the first embodiment. But it should be noted that the switching element 4 and switching element 11 have their concurrent OFF period during which the voltage applied to them vary. The capacitor 15 connected across the switching element 4 can relax an abrupt rise or fall in the voltage waveform in turn-off or turn-on of the switching element 4. Further, since the switching element 4 can be turned on after the energy stored in the capacitor 15 is returned to the input DC power source 1, the turn-on loss of the switching element 4 does not occur. The same effect can be obtained also for the switching element 11. The operation other than that at the transient time described above, which is entirely the same as in the first embodiment, will not explained here.

When the capacitor 15 is provided, the output impedance in each winding in the transformer varies at the transient time, particularly, the initial current value in each winding when the switching element 4 is OFF varies. But, this slightly influence the control operation itself so that the resonance current can be taken as the secondary winding current. In addition, since the waveform of the voltage applied to the switching element 4 and switching element 11 is not abrupt or steep, noise occurrence can be restricted and the switching loss relative to the switching element 4 and switching element 11 can be also restricted. The above arrangement of this embodiment, in which the capacitor 13 and diode 12 constitute a clamping circuit, has an advantage that the surge voltage due to turn-off of the switching element 4 in the first prior art is not produced.

Embodiment 3

Figure 5:
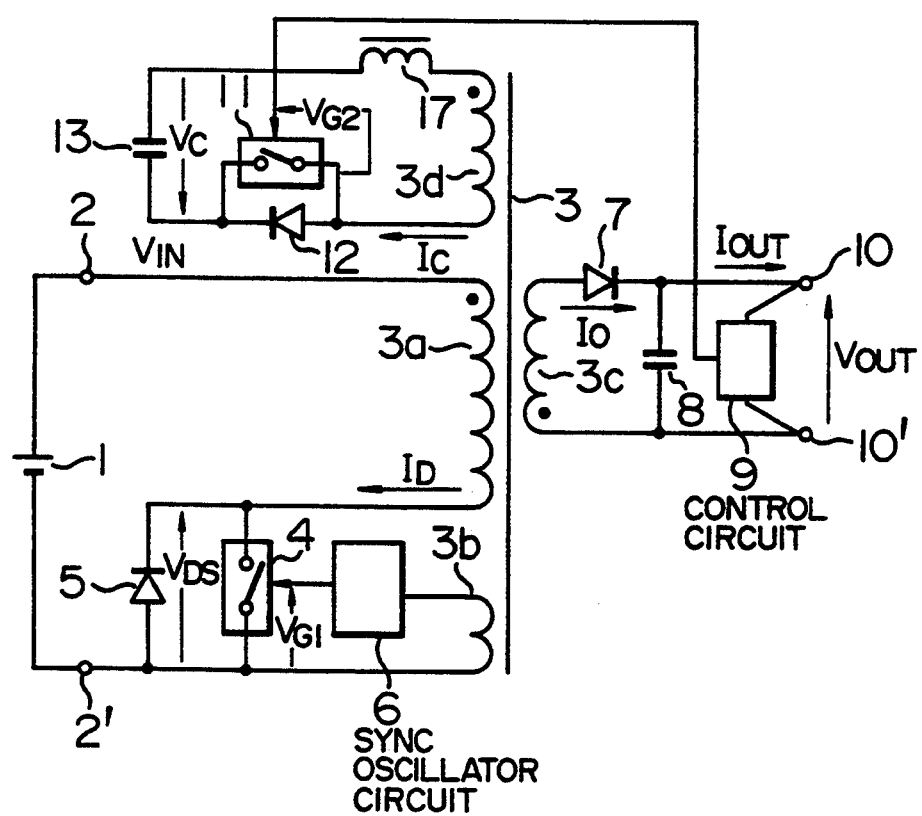
FIG. 5 is a circuit diagram of the switching power device according to the third embodiment of the present invention.

Now referring to FIGS. 5 and 6, an explanation will be given of the third embodiment of the present invention. FIG. 5 shows an arrangement of the switching power source device according to the third embodiment of the present invention. In FIG. 5, like reference numerals which will not explained here in detail designate like parts in FIG. 9. Numeral 1 denotes a DC power source; 2-2' input terminals; 3 a transformer having a primary winding 3a, a secondary winding 3c, an auxiliary winding 3d and a bias winding 3b; 4 a switching element serving as a first switching means; 5 a diode; 6 a sync oscillator circuit; 7 a rectifying diode; and 8 a smoothing capacitor. The diode 7 and smoothing capacitor 8 constitute a first rectifying and smoothing circuit. Numeral 9 denotes a control circuit and 10-10' denote output terminals.

Numeral 11 denotes a switching element serving as a first switching means which is on-off controlled by the control circuit 9. Within the control circuit 9, the part connected with the output terminals 10-10' and the part for driving the switching element 11 are separated from each other. Numeral 12 denotes a rectifying diode and 13 denotes a smoothing capacitor. The rectifying diode 12 and smoothing capacitor 13 constitute a second rectifying and smoothing circuit. Numeral 17 denotes leakage inductance between the auxiliary winding 3d and secondary winding 3c of the transformer 3 or an externally attached inductance element. The smoothing capacitor 13 and the leakage inductance or inductance element 14 are set to resonate with each other so that the current waveform of the rectifying diode 7 is sinusoidal.

Figure 6:
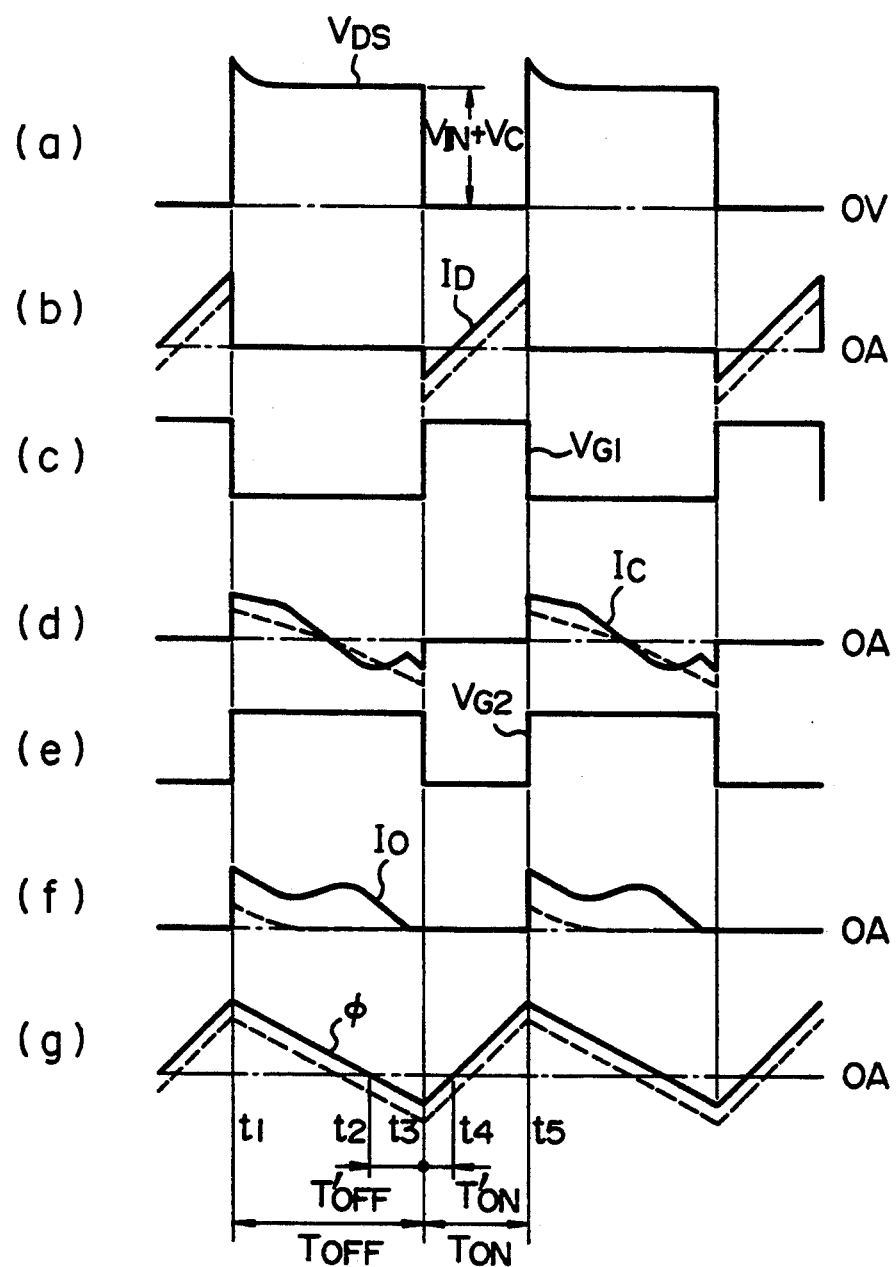
FIG. 6 shows waveform charts for explaining several operation waveforms in the circuit of FIG. 5.

Referring to FIG. 6 showing the waveform charts at the various parts of the switching power source device, its operation will be explained.

In FIG. 6, (a) shows the voltage waveform $V_{DS}$ across the switching element 4; (b) shows the waveform of the primary current $I_D$ flowing through the switching element 4 or diode 5; (c) shows the waveform of the driving pulse $V_{G1}$ for the switching element 4 in the sync oscillator circuit 6; (d) shows the waveform of the primary current $I_C$ flowing through the switching element 11 or rectifying diode 12; (e) shows the waveform of the driving pulse $V_{G2}$ for the switching element 11; (f) shows the secondary current $I_O$ flowing through the secondary winding 3c; and (g) shows the changes in the magnetic flux $\Phi$ in the transformer 3.

The primary current $I_D$ flowing through the primary winding 3a during the ON period of the switching element 4, which operates during the ON period determined by the sync oscillator circuit 6, generates magnetic flux in the transformer 3 to store energy in it. Then, an induced voltage is generated in the secondary winding 3c of the transformer 3. The induced voltage is so adapted that it reverse-biases the rectifying diode 7. The rectifying diode 12 on the primary winding side is also reverse-biased and the switching element 11 is in an "OFF" state.

When the OFF signal from the sync oscillator circuit 6 turns off the switching element 4, a flyback voltage is generated in the auxiliary winding 3a to forward-bias the rectifying diode 12 and also generated in the secondary winding 3c so that the voltage is applied to the rectifying diode 7 in its forward-biasing direction. Thus, the energy stored in the transformer 3 is discharged as a primary current $I_C$ through the auxiliary winding 3d and rectifying diode 12 and the current is smoothed by the smoothing capacitor 13 to provide a DC voltage $V_C$. The energy is also discharged as a secondary current $I_O$ through the secondary winding 3c and the current is smoothed by the smoothing capacitor 8 to be supplied to the output terminals 10-10' as an output voltage $V_{OUT}$.

Then, the control circuit 9 turns on the second switching element 11, but any particular change in the operation does not occur if the auxiliary winding current $I_C$ flows through either the rectifying diode 12 or switching element 11. Taking no account of the capacitance component such as parasitic capacitance, when the switching element 4 turns off and the polarity of the voltage in each of the windings of the transformer 3 is reversed, the energy stored in the transformer 3 is discharged so as to be distributed to the auxiliary winding 3d and the secondary winding 3c in accordance with the leakage inductance of the transformer 3 and the inductance of the leakage inductance or inductance element 17.

Then, since the rectifying diodes 7 and 11 are "ON", the current flowing through each winding is a transient current in the closed circuit composed of the smoothing capacitor 13, leakage inductance or inductance element 14 and smoothing capacitor 8 which are connected through the auxiliary winding 3d and secondary winding 3c. This current, since the resonance frequency of the capacitor 13 and the leakage inductance or inductance is set for a sufficiently small value, becomes a sinusoidal resonance current.

Then, since the stored energy is discharged from the transformer 3 with the DC voltage $V_C$ applied to the auxiliary winding 3d, the magnetic flux $\Phi$ in the transformer 3 decreases linearly. The secondary winding current $I_O$ is the sum of the excitation current inducing the magnetic flux $\Phi$ and the auxiliary winding current which is the resonance current. Since the resonance period of the resonance current is set sufficiently small, the secondary winding current $I_O$ will decrease to zero before long to turn off the rectifying diode 7. When the smoothing diode is "ON", the sinusoidal resonance current flows as the auxiliary winding current $I_C$; on the other hand, when the smoothing diode is "OFF", the resonance current disappears and only the excitation current flows.

In the above process, the auxiliary winding current $I_C$ becomes negative, but the switching element 11 is "ON" so that the resonance is maintained. Thus, now conversely, the current discharged from the smoothing capacitor 13 flows into the auxiliary winding 3d through the switching element 11. Also after the energy stored in the transformer 3 has been discharged during the ON period of the switching element 4, the DC voltage $V_C$ is applied through the switching element 11 to the transformer 3 so as to be reversely excited to store energy in the reverse direction.

When the switching element 11 is turned off by the control circuit 9, the polarity of the voltage in each of the winding is reversed and thus the induced voltage in the primary winding 3a is generated in such a direction that the connection end of the switching element 4 is at a negative voltage and that of the input terminal 2 is at a positive voltage. Thus, the primary current $I_D$ flows in such a direction that the input DC power source 1 is charged through the diode 5 so that the energy in the transformer 3 stored during the OFF period is returned as power to the input DC power source 1.

Then, the sync oscillator circuit 6 turns on the switching element 4, but no particular change in its operation occurs according to the path through which the primary current $I_D$ flows. When the energy stored in the transformer 3 during the OFF period is discharged completely so that the primary current becomes zero, the primary current $I_{OUT}$ flows in the charging direction opposite to the above case from the input DC power source 1 through the switching element 4 already turned on. Thus, magnetic flux is generated in the transformer 3 so as to store energy in it.

In this state, the polarity of the induced voltage generated in each of the windings of the transformer 3 is not changed so that the sync oscillator circuit 6 maintains the ON state of the switching element 4. When the switching element 4 which operates during the ON period determined by the sync oscillator circuit 6 turns off, the energy stored in the transformer 3 is discharged toward the smoothing capacitor 13 through the auxiliary winding 3a and as the secondary current $I_O$ through the secondary winding 3c. If the above operations are repeated, the output voltage is continuously supplied from the output terminals 10-10'.

A detailed explanation will be given of the operation of controlling the output voltage so as to be stable. FIG. 6 shows various operation waveforms. Now it is assumed that the OFF period (t1-t3) of the driving pulse waveform $V_{G1}$ in the sync oscillator 6 is $T_{OFF}$ and the reverse excitation period (t2-t3) of the transformer 3 within it is $T'_{OFF}$ while the ON period thereof (t3-t5) is $T_{ON}$ and the return period (t3-t4) of the primary current $I_D$ within it is $T'_{ON}$. During the stabilizing operation of the switching power source device according to the present invention, the DC voltage $V_C$ takes the sum of the DC component and the resonance voltage of the smoothing capacitor 13 and the leakage inductance or inductance element 14; but its change be made sufficiently small. On the other hand, the primary current $I_{ON}$ during the OFF period, i.e., the ripple current from the smoothing capacitor 13 has an average current of 0A because the charging and discharging currents are equal to each other. Thus, the energy from the second wiring 3c and supplied from the output terminals 10-10' is equal to a difference between the energy stored in the transformer 3 during the ON period and the energy returned to the input DC power source 1 during the $T'_{ON}$ period.

On the other hand, it is apparent that the DC voltage $V_C$ can be represented by Equation (4) as long as the DC voltage $V_C$ is taken as the output voltage with no load in the operation of stabilizing the output voltage from the regenerative control type switching power source device which has been explained as the prior art. Further, since the output voltage $V_{OUT}$ from the switching power source, which is obtained by rectifying the flyback voltage in the secondary winding 3c, can be regulated by changing the DC voltage $V_C$ the variation width of which can be made sufficiently small, as represented by Equation (5). Even if the variation width of $V_C$ is large, the output voltage $V_{OUT}$ can be regulated by the average value of $V_C$. For example, when the output current $I_{OUT}$ decreases and the output voltage $V_{OUT}$ increases, the ON period of the switching element 11 (i.e., the OFF period $T_{OFF}$ of the switching element 4) is lengthened by the control circuit 9, and the charge discharged from the smoothing capacitor 13 is larger than the charge charged therein so that the average value of the DC current $V_C$ decreases gradually. When the DC voltage $V_C$ decreases, the output voltage $V_{OUT}$ also decreases and the voltage $V_C$ generated in and applied to the winding of the transformer 3 during the OFF period decreases. Thus, the gradient of the primary current $I_C$ is also relaxed so that the DC voltage $V_C$ eventually settles down at such a value that the output voltage $V_{OUT}$ becomes a prescribed voltage.

As a result, the output voltage $V_{OUT}$ can be stabilized by regulating the ON period of the switching element 11. The DC voltage $V_C$ for correcting the change (load regulation) in the output voltage $V_{OUT}$ due to the change in the output current $I_{OUT}$ provides less change essentially. Thus, if the ON period $T_{ON}$ is fixed, the OFF period $T_{OFF}$ does not almost vary, and the switching frequency and the changing width $\Delta B$ in the magnetic flux are also almost fixed. This way is shown in broken lines in FIG. 6. The above arrangement of this embodiment has an advantage that the resonance current can be taken as the secondary winding current. In addition, although a snubber circuit is required against the surge voltage generated in turn-off of the switching element 4, the arrangement has also an advantage that the number of windings in the auxiliary winding 3d can be set optionally and the induced voltage can be varied to set the withstand voltage of the switching element 11, diode 12 and smoothing capacitor 13. It is also possible to take out the output across the smoothing capacitor 13.

Embodiment 4

Figure 7:
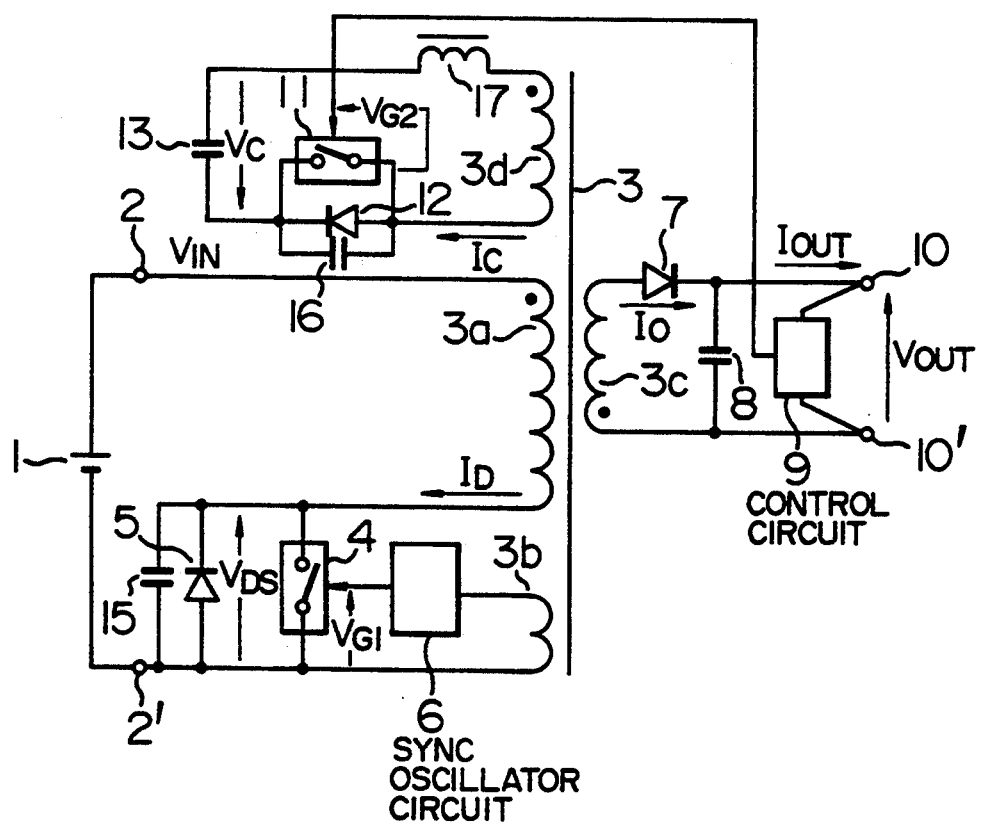
FIG. 7 is a circuit diagram of the switching power device according to the fourth embodiment of the present invention.

Now referring to FIGS. 7 and 8, an explanation will be given of the fourth embodiment of the present invention. FIG. 7 shows an arrangement of the switching power source device according to the fourth embodiment of the present invention. In FIG. 5, like reference numerals which will not explained here in detail designate like parts in FIG. 9. Numeral 1 denotes a DC power source; 2-2' input terminals; 3 a transformer having a primary winding 3a, a secondary winding 3c, an auxiliary winding 3d and a bias winding 3b; 4 a switching element serving as a first switching means; 5 a diode; 6 a sync oscillator circuit; 7 a rectifying diode; and 8 a smoothing capacitor. The diode 7 and smoothing capacitor 8 constitute a first rectifying and smoothing circuit. Numeral 9 denotes a control circuit and 10-10' denote output terminals.

Numeral 11 denotes a switching element serving as a first switching means which is on-off controlled by the control circuit 9. Within the control circuit 9, the part connected with the output terminals 10-10' and the part for driving the switching element 11 are separated from each other. Numeral 12 denotes a rectifying diode and 13 denotes a smoothing capacitor. The rectifying diode 12 and smoothing capacitor 13 constitute a second rectifying and smoothing circuit. Numeral 17 denotes leakage inductance between the auxiliary winding 3d and secondary winding 3c of the transformer 3 or an externally attached inductance element. The smoothing capacitor 13 and the leakage inductance or inductance element 14 are set to resonate with each other so that the current waveform of the rectifying diode 7 is sinusoidal. Numeral 15 denotes a capacitor which is connected across the switching element 4 and serves to restrain an abrupt variation in the voltages applied to the switching element 4. Numeral 16 denotes a capacitor which is connected across the switching element 11 and serves to restrain an abrupt variation in the voltages applied to the switching element 11. It should be noted that the on-off signals in the control circuit 9 and sync oscillator circuit 6 are so set that the switching elements 4 and 11 have their concurrent OFF period.

Figure 8:
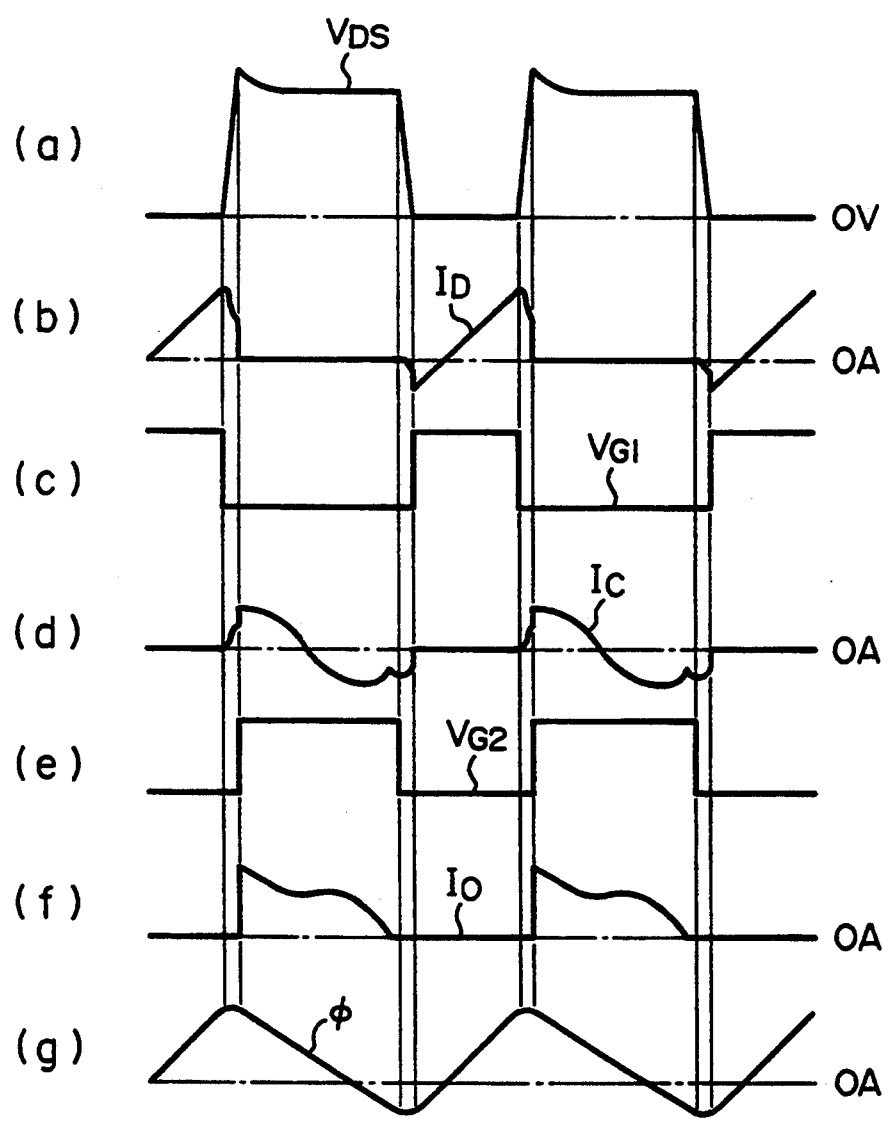
FIG. 8 shows waveform charts for explaining several operation waveforms in the circuit of FIG. 7.

Referring to FIG. 8 showing the waveform charts at the various parts of the switching power source device, its operation will be explained.

In FIG. 8, (a) shows the voltage waveform $V_{DS}$ across the switching element 4; (b) shows the waveform of the primary current $I_D$ flowing through the switching element 4 or diode 5; (c) shows the waveform of the driving pulse $V_{G1}$ for the switching element 4 in the sync oscillator circuit 6; (d) shows the waveform of the primary current $I_C$ flowing through the switching element 11 or rectifying diode 12; (e) shows the waveform of the driving pulse $V_{G2}$ for the switching element 11; (f) shows the secondary current $I_O$ flowing through the secondary winding 3c; and (g) shows the changes in the magnetic flux $\Phi$ in the transformer 3.

The basic operation according to this embodiment is the same as that in the circuit configuration according to the first embodiment. But it should be noted that the switching element 4 and switching element 11 have their concurrent OFF period during which the voltage applied to them vary. The capacitor 15 connected across the switching element 4 can relax an abrupt rise or fall in the voltage waveform in turn-off or turn-on of the switching element 4. Further, since the switching element 4 can be turned on after the energy stored in the capacitor 15 is returned to the input DC power source 1, the turn-on loss of the switching element 4 does not occur. The capacitor 16 connected across the switching element 16 can also relax an abrupt rise or fall in the voltage waveform in turn-off or turn-on of the switching element 11. Further, since the switching element 11 can be turned on after the energy stored in the capacitor 15 is returned to the input DC power source 1, the turn-on loss of the switching element 4 does not occur.

The operation other than that at the transient time described above, which is entirely the same as in the third embodiment, will not explained here. When these capacitors are provided, the output impedance in each winding in the transformer varies at the transient time, particularly, the initial current value in each winding when the switching element 4 is OFF varies. But, this slightly influence the control operation itself so that the resonance current can be taken as the secondary winding current. In addition, since the waveform of the voltage applied to the switching element 4 and switching element 11 is not abrupt or steep, noise occurrence can be restricted and the switching loss relative to the switching element 4 and switching element 11 can be also restricted. Further, although a snubber circuit is required against the surge voltage generated in turn-off of the switching element 4, the arrangement has also an advantage that the number of windings in the auxiliary winding 3d can be set optionally and the induced voltage can be varied to set the withstand voltage of the switching element 11, diode 12 and smoothing capacitor 13. It is also possible to take out the output across the smoothing capacitor 13.

Additionally, in the first embodiment, the smoothing capacitor 13 was connected between the input terminal 2 and the cathode of the rectifying diode 12, but it is needless to say that it may be connected between the input terminal 2' and the cathode of the rectifying diode 12. In the second embodiment, the capacitor 15 was connected across the first switching element, but the same effect can be obtained when it is connected across the primary winding 3a of the transformer 3, across the second switching element 11, or across both of them. In the fourth embodiment, the capacitor 15 was connected across the switching element 4, the same effect can be obtained when it is connected across the primary winding 3a of the transformer 3 or across both of the switching element 4 and the primary winding 3a. Further, in the fourth embodiment, the capacitor 16 was connected across the switching element 11, but the same effect can be obtained when it is connected across the auxiliary winding 3d or both of the switching element 11 and the auxiliary winding 3d. The capacitors 15 and 16 can be also provided by the parasitic capacitances of the switching elements 4 and 11 or distributive capacitances of the transformer 3.

In the first to fourth embodiments, the inductance for resonance was provided on the side of the primary winding or auxiliary winding, the leakage inductance or inductance element may be located at any position of the loop composed of the capacitors 13 and 8 which are connected by the transformer 3. Further, in the first to fourth embodiments, a single output type composed of a single secondary winding 3c and a single rectifying and smoothing circuit was adopted, but a multi-output type composed of plural secondary windings 3c and plural rectifying and smoothing circuits may be taken. Further, in these embodiments, the switching element 4 and switching element 11 were such a self-exciting type that the former is on-off controlled by the sync oscillator circuit 6 and the latter is on-off controlled by the control circuit 9, but these switching elements may be the type controlled by any control method.

As understood from the description hitherto made, in accordance with the present invention, without impairing the advantage of the prior art regenerative switching power source device that the switching frequency and variation width of the magnetic flux fluctuate very slightly with load and the zero-crossing turn-on can be realized, the secondary current of the transformer can be made sinusoidal so that the turn-off current of the rectifying and smoothing means connected on the secondary winding side can be reduced to zero or made small, and the loss or noise can be effectively restricted. The sinusoidal current can be provided with minimized noise. The capacitance of the capacitor can be reduced. Thus, in accordance with the present invention, an excellent switching power source device which is small in size, high in output stability and high in efficiency can be realized.

We claim:

1. A switching power source device comprising:
   first switching means for repeatedly switch on and off;
   a transformer having a primary winding and at least one secondary winding, said primary winding being supplied with an input voltage to store energy in said transformer when said first switching means is ON;
   first rectifying and smoothing means for acquiring an output from the energy discharged from said at least one secondary winding of said transformer when said first switching means is OFF;
   second rectifying and smoothing means for acquiring a DC voltage from energy discharged from said primary winding of said transformer when said first switching means is OFF; and
   second switching means for repeatedly switching on and off alternately with said first switching means, wherein the DC voltage is applied through said second switching means to said primary winding of said transformer to store energy in said transformer, the energy stored in said transformer is returned from said primary winding of said transformer to said input voltage when said second switching means is OFF, and the output voltage is controlled by changing the on-off ratio in said first and second switching means, and
   wherein in the closed circuit composed of said first and said second rectifying and smoothing means which are connected by said transformer, an inductance component induced in a magnetic circuit including said primary winding and said at least one secondary winding of said transformer, and at least one of said first and second rectifying and smoothing means, resonate with each other, so that current from said at least one secondary winding is taken as a resonating current.

2. A switching power source device according to claim 1, further comprising at least one capacitor connected across one of said first switching means and said second switching means, wherein said first and said second switching means have their concurrent OFF period and repeatedly switch on and off alternately with each other.

3. A switching power source device comprising:
   a first switching means for repeatedly switching on and off;
   a transformer having a primary winding, an auxiliary winding and at least one secondary winding, said primary winding being supplied with an input voltage to store energy in the transformer when said first switching means is ON;
   first rectifying and smoothing means for acquiring an output from the energy discharged from the secondary winding of said transformer when said first switching means is OFF;
   second rectifying and smoothing means for acquiring a DC voltage from energy discharged from the auxiliary winding of said transformer when the first switching means is OFF; and
   second switching means for repeatedly switching on and off alternately with the first switching means,
   wherein the DC voltage is applied through said second switching means to said auxiliary winding of said transformer to store energy in said transformer, the energy stored in said transformer is returned from said primary winding of said transformer to said input voltage when said second switching means is OFF, and the output voltage is controlled by changing the on-off ratio in said first and second switching means, and
   wherein in the closed circuit composed of said first and said second rectifying and smoothing means which are connected by said transformer, an inductance component induced in a magnetic circuit including said auxiliary winding and said at least one secondary winding of said transformer, and at least one of said first and said second rectifying and smoothing means, resonate with each other, so that the current from the secondary winding is taken as a resonating current.

4. A switching power source device according to claim 3, further comprising at least one capacitor connected across one of said first switching means and said second switching means, wherein said first and said second switching means have their concurrent OFF period and repeatedly switch on and off alternately with each other.

* * * * *